(12) United States Patent
Armer et al.

(10) Patent No.: US 8,864,326 B2
(45) Date of Patent: Oct. 21, 2014

(54) ADJUSTABLE LIGHT FOR UNDERWATER PHOTOGRAPHY

(75) Inventors: Jarod Armer, Aromas, CA (US); Doug Foss, Pacific Grove, CA (US); Mark Olsson, La Jolla, CA (US); Christopher McCaslin, Alameda, CA (US)

(73) Assignee: Light & Motion Industries, Marina, CA (US)

( * ) Notice: Subject to any disclaimer, the term of this patent is extended or adjusted under 35 U.S.C. 154(b) by 0 days.

(21) Appl. No.: 13/373,477

(22) Filed: Nov. 14, 2011

(65) Prior Publication Data

US 2012/0140433 A1    Jun. 7, 2012

Related U.S. Application Data

(60) Provisional application No. 61/414,873, filed on Nov. 17, 2010.

(51) Int. Cl.
| | |
|---|---|
| *G03B 15/02* | (2006.01) |
| *F21L 4/00* | (2006.01) |
| *F21S 4/00* | (2006.01) |
| *F21V 21/00* | (2006.01) |
| *F21V 3/00* | (2006.01) |
| *F21V 5/00* | (2006.01) |
| *F21V 29/00* | (2006.01) |
| *B63C 11/52* | (2006.01) |
| *F21V 9/08* | (2006.01) |
| *F21Y 101/02* | (2006.01) |
| *F21Y 105/00* | (2006.01) |

(52) U.S. Cl.
CPC .............. *F21V 31/055* (2013.01); *G03B 15/02* (2013.01); *F21Y 2101/02* (2013.01); *F21V 29/004* (2013.01); *F21L 4/00* (2013.01); *G03B 2215/0592* (2013.01); *G03B 2215/0567* (2013.01); *B63C 11/52* (2013.01); *F21Y 2105/001* (2013.01); *F21V 9/083* (2013.01); *Y10S 362/80* (2013.01)
USPC ..... 362/6; 362/158; 362/249.02; 362/311.01; 362/800

(58) Field of Classification Search
CPC ....................................................... F21V 29/30
USPC .............. 362/6, 10, 158, 249.02, 311.01, 800
See application file for complete search history.

(56) References Cited

U.S. PATENT DOCUMENTS

| | | | | |
|---|---|---|---|---|
| 7,125,146 | B2 * | 10/2006 | Willis et al. | 362/267 |
| 7,303,301 | B2 * | 12/2007 | Koren et al. | 362/101 |
| 7,311,417 | B1 * | 12/2007 | Lemke | 362/158 |
| 7,520,629 | B2 * | 4/2009 | Johnson et al. | 362/103 |

(Continued)

*Primary Examiner* — Ismael Negron
*Assistant Examiner* — William N Harris
(74) *Attorney, Agent, or Firm* — Thomas M. Freiburger (57) ABSTRACT

An underwater diving light has a rotatable front filter ring for selecting light filtration as needed for underwater still or video photography conditions. The filter ring is removable and interchangeable with different rings. Another important feature is efficient cooling of the LEDs and other internal electronics of the diving light assembly. The water is in contact with a metallic front face that conducts heat directly away from a metal core circuit board carrying the LED array or arrays. In one form of the diving light water channels are provided so that the ambient water can enter the assembly to spaces behind the LCD circuit board to efficiently cool the LEDs and associated electronics. The front plate assembly can be removable, for rinsing the internal cooling cavities, for interchange with different front face assemblies, and for air travel when the LCDs must be removed from driving electronics for safety concerns.

17 Claims, 11 Drawing Sheets

(56) References Cited

U.S. PATENT DOCUMENTS

| | | | |
|---|---|---|---|
| 2001/0007414 A1* | 7/2001 | Inoue et al. | 315/241 P |
| 2002/0125804 A1* | 9/2002 | McGuire et al. | 313/112 |
| 2006/0018113 A1 | 1/2006 | Upmeyer | |
| 2006/0039150 A1 | 2/2006 | Mayer et al. | |
| 2006/0067077 A1* | 3/2006 | Kumthampinij et al. | 362/294 |
| 2007/0145915 A1* | 6/2007 | Roberge et al. | 315/312 |
| 2009/0154164 A1* | 6/2009 | Hsu et al. | 362/267 |
| 2010/0033948 A1* | 2/2010 | Harbers et al. | 362/84 |

* cited by examiner

ADJUSTABLE LIGHT FOR UNDERWATER PHOTOGRAPHY

This application claims benefit of provisional application Ser. No. 61/414,873, filed Nov. 17, 2010.

BACKGROUND AND SUMMARY OF THE INVENTION

The invention concerns underwater video lighting, and particularly a unit producing a powerful beam from LED sources, with the ability to adjust light filtration by rotation of a front filter ring. The underwater light may produce flood light at about 4000 lumens and weighs less than two pounds.

A number of underwater lighting devices are available for divers, some with rechargeable batteries and some also including flip-down color filters, such as red filters.

When an underwater photographer, including a video photographer, dives below about thirty feet during daylight, virtually all red has been filtered out of the ambient light. Because of the color adjustment (white balance) that is usually made by the diver's video camera, the colors in the video images will be adjusted to replace the red, but light projected from a diving light will compete with ambient light and areas of the video image that include the artificial light will appear overly red when color-balanced by the camera. The situation is different in night diving, in which the only light available is that from the diving light, and unbalance of color in different areas of the image is not a problem.

Most diving lights previous to this invention have been little more than waterproof flashlights. None has included any filter to address the color balance problem noted above, nor has any included a convenient multi-filter manual selection on a powerful video diving light as in the current invention described below.

The diving light of the invention, particularly for video support, is a relatively large underwater device, yet light in weight, with a beam which can be about 4000 lumens of flood light. Within the light's casing is a battery providing for about one hour of light at 4000 lumens (or about two hours of light at 2000 lumens, or about four hours of light at 1000 lumens).

The dive light of the invention has a snap-on front filter ring, interchangeable with other filter rings as selected, the filter ring being rotatable about the face of the light casing and having several selectable filters. Light projection is from an off-center position on the face of the housing, enabling different filters to be placed in front of the light beam by rotation of the bezel. One important filter preferably included on the dive light is a blue/green filter, which can be used to approximately match the projected light beam to the ambient lighting when diving in conditions of near-total red depletion from the natural light.

The light source of the device is a very tight cluster of LEDs, which may be sixteen in number. The tight cluster enables the off-center positioning of the light source as noted above. The tight LED array generates considerable heat, making the LED mounting board and surrounding areas hotter than would be the case if the LEDs were spread around the entire face of the housing. To dissipate the heat the LEDs are mounted onto a metal core board, and the face of the unit preferably is mostly metal and contacts the LED board. This provides an efficient heat sink for the LED array. Only a small sealed window is provided, directly in front of the LED cluster.

Federal Aviation Administration (FAA) regulations require that devices generating significant amounts of heat must have the power source and heat generating element physically disconnected for air travel. So the device must allow a user easily to physically disconnect the LED cluster from the battery at some point in the circuit. Most dive lights do this by either (a) allowing the user to disconnect and/or remove an internal battery, or (b) using a separate battery housing with a cable and connector leading to the light head. The former requires opening a part of the device that is typically sensitive to water intrusion. Opening and closing a pressure seal repeatedly can and does introduce physical damage or dirt and grime to the seal, providing a path to potential flooding and corrosion. The latter adds a second pressure hull and a flexible cable, both of which are additional potential failure points.

An important second aspect and form of the invention therefore encompasses an advanced sealing setup. In use it is an entirely self-contained assembly, but it allows disconnection for FAA compliance, and when disconnected the separate assemblies are themselves completely sealed. Specifically, in this form the face plate assembly containing the LEDs is an individual pressure hull, but it can be easily removed by unthreading the bezel ring and pulling the face plate assembly off of the body unit. The body unit is itself an individual pressure hull. As an added benefit for easy storage and to prevent possible damage, the bezel ring allows the face plate assembly to be flipped over and stored backward, so that the device is electrically disconnected but physically in one piece.

In order to allow this easy disconnect, the back of the metal core circuit board is equipped with a series of exposed contact pads on the rear face. These pads are plated with a corrosion-resistant material, typically gold, and they are contacted by a series of spring-loaded knee-type contacts attached to an intermediary plate on the front of the body unit. The knee-type contacts are also plated with corrosion-resistant material. A heavy-gauge nonconductive alignment pin is used to help the user align the face plate assembly to the body unit so the connections are made reliably. The face plate assembly is sealed to the body unit by a large bore o-ring so that the entire area between the face plate assembly and the body unit is dry.

Another important part of the face plate assembly and body unit structure is cooling of electronics contained in the body unit. While the LEDs produce most of the heat in the system, the drive electronics can produce upwards of 10%, or about 6 watts when running at 4000 lumens. Without proper heat dissipation the drive electronics can overheat and fail. For this reason, in this second form of the invention, the intermediary plate is equipped with thermal transfer pads that interface to wide areas on the rear of the face plate assembly, providing a relatively short thermal path from hot components to intermediary plate to face plate to water. In this form, both the metal core circuit board and the intermediary plate are passing heat through the face plate to the water, which is fairly efficient.

In order to output the maximum amount of light possible, LEDs must be cooled as much as possible. In a typical case, cooling the LEDs from 55 down to 45 degrees Celsius will increase output approximately 100 lumens when running at 4000 lumens, with no other changes, so the shortest heat path from LED to water is desirable.

In the first and second forms of the invention, the metal core circuit board is connected around its edges to the face plate. Thus all the heat must travel laterally across the metal core circuit board to be conducted away. In a third form of the invention, the face plate assembly is not sealed to the body unit, but instead it has large holes to allow water flow into the cavity between body unit and face plate assembly. The face plate assembly has a large rear cap that encloses the metal core circuit board to protect it from corrosion. This rear cap also has a collared area that extends toward the intermediary plate and creates a sealed volume around the connector pads and connector. Thus the heat path is through the thickness of the metal core circuit board and the thickness of the rear cap, rather than along a greater lateral distance.

In a fourth form of the invention, the metal core circuit board is allowed to directly contact the water, for even better cooling. This can introduce corrosion on the metal core circuit board, but if the device is properly rinsed in fresh water and dried between uses (typical and customary for this type of equipment) the corrosion is minimal and the heat path is reduced further to just metal core circuit board to water. In this form, the rear cap takes a different form and is just the collar bolted to the central area of the metal core circuit board, to form the sealed volume around the connector. Additional benefits of this form are reduction in overall weight, and increased volume of cooling water inside the head, due to the smaller sealing collar instead of the fully enclosing cap of the third form.

Another form of the invention that is compatible with any of the four sealing and thermal solutions discussed above, employs a second array of LEDs added to a larger metal core circuit board. The multi-function switch on the body unit provides the user the ability to easily turn on one or the other array of LEDs. The second array can be a different color such as red, can be electromagnetic energy outside the visible spectrum such as infrared or UV light, or can be any wavelengths of light focused by dedicated optics, such that the upper array can provide a wide flood light and the lower array a focused spot beam. The advantage of the clustered arrays is that the blue or red filters held by the rotating filter ring enable use of light either filtered or unfiltered, by rotating the filter ring into various positions.

Another benefit of the removable front plate is the ability to provide interchangeable face plate assemblies to a user. A user might choose to switch face plates (a) to upgrade to a new brighter set of LEDs, (b) to replace a failed face plate or body unit, (c) to switch between colors or types of single-mode face plate units, for instance spot-only for flood-only, (d) to switch from a single-mode face plate unit to a multi-mode face plate unit such as spot plus flood. The body unit electronics can be designed to recognize the available use modes of the attached face plate unit by a detector circuit, and adjust the type of switching available to increase ease of use.

A typical equipment setup for underwater still photography includes a sealed camera housing and one or more underwater strobe units. In the past, film photography required the intense output of powerful flashbulbs; these flashbulbs produced very short bursts of light typically 8-10 times as bright as video lights. Digital photography increasingly allows use of much less powerful lighting to achieve the same results. As self-contained underwater lights increase in power, it is possible to completely replace dedicated flash units with video lights in some situations. Replacing strobes is even more practical if the video lights are capable of producing short bursts at increased power levels, for instance two times the maximum constant output of the light for video use. The final form of the invention, which is compatible with all other forms previously discussed, addresses this need. In this form, one or more large capacitors are added to the electronic circuit to provide a short, powerful burst of energy, which along with the power available directly from the battery, is capable of generating the flash output. The battery charges the capacitor (s) in between flashes. The flash is timed to the shutter of the camera by a synch cable. The synch cable can be a fiber optic cable carrying light from the camera's flash unit, or an electronic cable carrying an industry-standard synch signal.

The light unit of the invention is charged using external wet style connectors, allowing the body unit to be sealed at the factory and never opened in the field, improving reliability for the diver.

It is an object of the invention to improve over previous dive lights available for video support, including in brightness, duration, cooling efficiency, and convenient filtering of the light beam as needed. These and other objects, advantages and features of the invention will be apparent from the following description of a preferred embodiment, considered along with the accompanying drawings.

DESCRIPTION OF PREFERRED EMBODIMENTS

Figure 1:
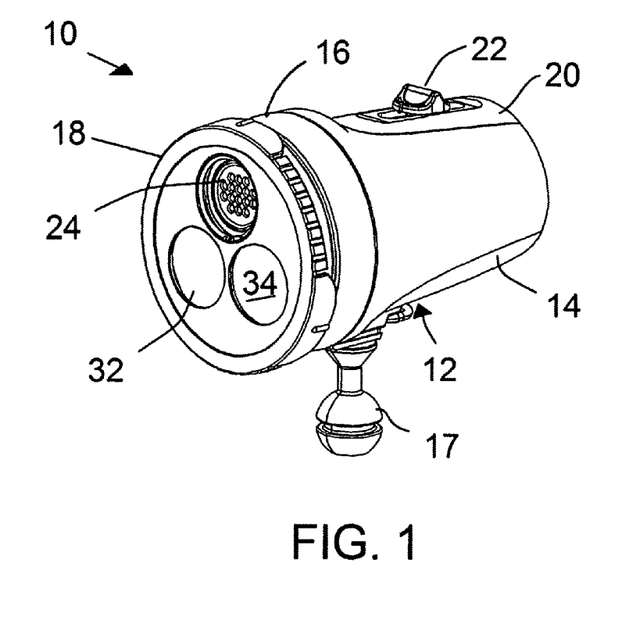
FIG. 1 is a perspective view showing a diving light of the invention.

In the drawings, FIG. 1 shows a dive light 10 having a housing 12 formed of a casing 14, a front section or face assembly 16 attached to the casing, which can be by sealed threaded connection, a mounting interface device 17 and a rotatable filter ring 18. The device 17 is shown as a standard interface, to be received in a socket on a camera light arm accessory. On the casing is a switch assembly 20 with slide switch 22, for switching the dive light on and off and selecting a desired power level. At the front of the dive light device a beam is projected by an array 24 of LEDs in a tight cluster as shown. These may be sixteen in number.

Figure 2:
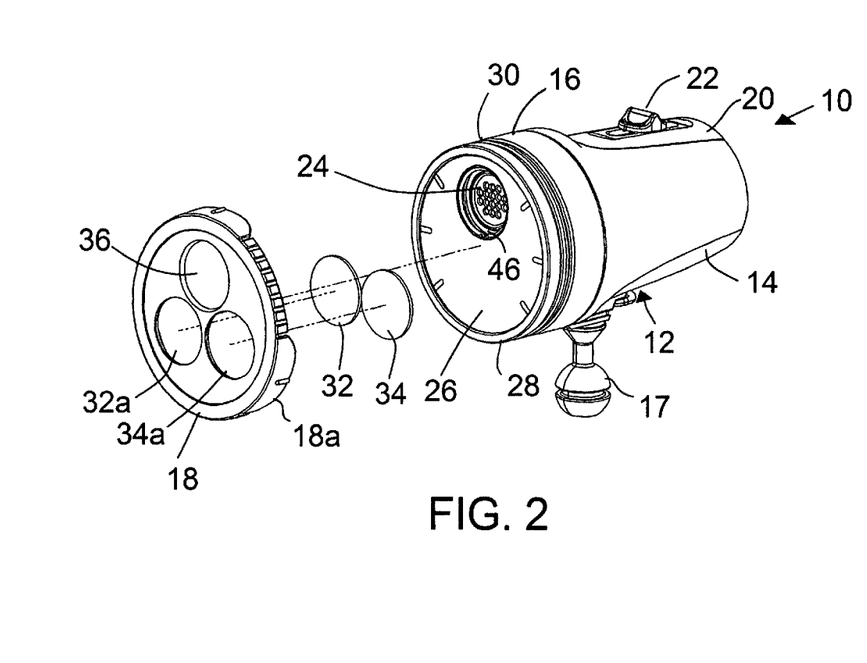
FIG. 2 is a partially exploded view of the first form of the diving light, showing a front filter ring removed.

With reference to both FIGS. 1 and 2, the filter ring 18 snaps onto and off a position of covering the front face 26 of the unit. The front of the unit has a bezel ring 28, forming an annular recess 30, which is gripped by overhanging structure (not shown in FIGS. 1 and 2) on the rim 18a of the filter ring to hold the filter ring in place on the housing, and to allow its snap-off removal and interchanging with another filter ring when desired. The purpose of the rotatable filter ring 18 is to provide different filtration for light emitted from the LED array 24. Light filters 32 and 34 are shown, secured in filter ring openings 32a and 34a. A third filter ring opening 36 can be fitted with another filter or can be left open, as shown, for a selection of no filtration.

As noted above, one of the filters 32 preferably is a blue/green (cyan) filter, for filtering out most of the red component of the light beam to match the artificial light closely with ambient light filtering through relatively deep water. The blue/green or cyan filter, used at depth, makes the LED light beam close to the color of natural light at depth, and the user's video (or still) camera will light balance the image correctly so that objects illuminated from the dive light will look normal in the video or photograph. This is a great advantage in daytime wide angle photography and video where ambient light is the dominant light; without the cyan filtration the dive light will produce different color lighting from the ambient light, creating an unbalanced and undesired appearance in the picture or video.

The other filter 34 can be a diffuser, which will spread and disperse the flood light more widely. Preferably, any of the optical filters are mounted in industry-standard threaded rings that can be assembled or disassembled from the filter ring simply by threading in or out.

The slide switch 22 is a toggle switch. It operates within the non-waterproofed switch assembly or sub-housing 20, by magnetic interface with magnetic pickups inside a sealed casing 14. In a preferred embodiment of a single-mode LED face plate, the switch is effective as follows: a momentary push forward will turn the light on, preferably at a medium power level, or power level 4; a series of further momentary pushes forward will change the beam to levels 5, then 6, then 7 or high power; a momentary push back will lower the light level among the seven different settings successively; and a forward or back push with a hold (e.g. two seconds) will turn the power off. When using multi-mode LED face plates, such as spot-flood, a momentary push forward or backward will change the power level upward or downward among the available number of power settings in the current array, a push and hold forward will switch between LED arrays (e.g. from spot to flood), and a push backward with a hold, will turn the light off.

Figure 3:
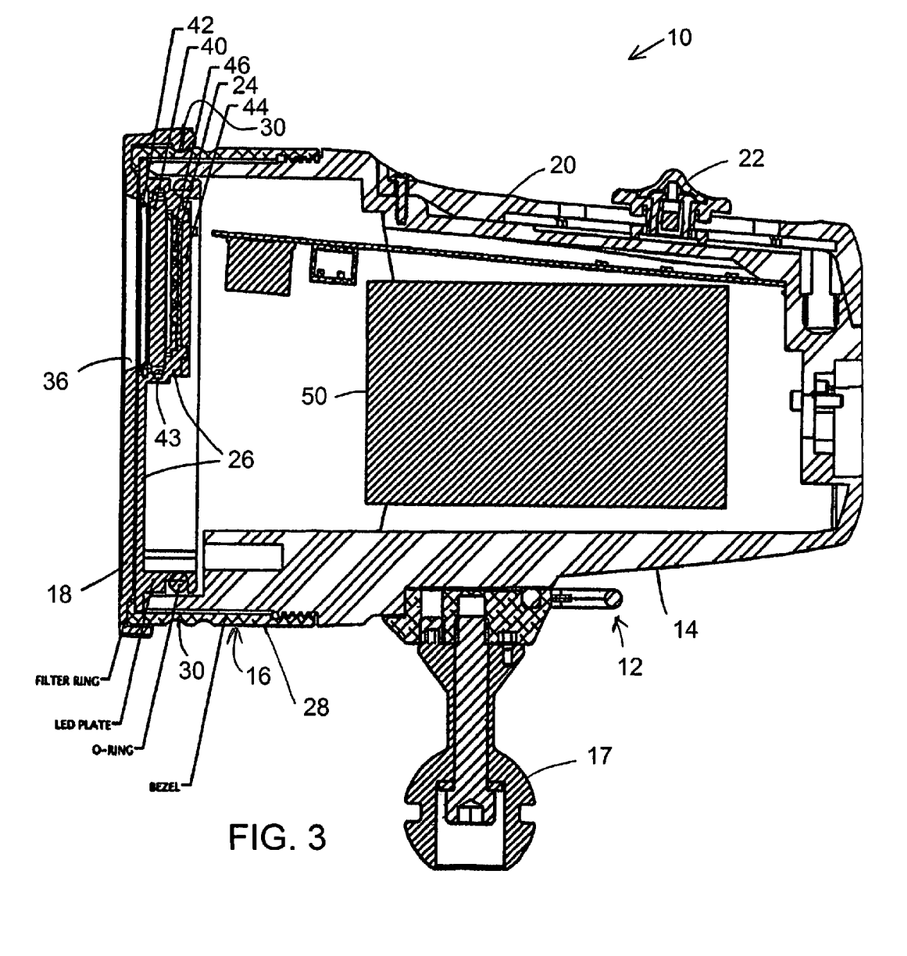
FIG. 3 is a side elevation view in section showing the assembly of the first form of the diving light, particularly the front.

FIG. 3 is a side elevation view of the first heat path option in section illustrating the dive light 10 and particularly positioning and connection of components at the front of the unit. The face plate is seen at 26. Within the upper opening of the face plate is a circular glass window 40 retained within a recess of the face plate using a retaining ring indicated at 42. A water tight seal is made with a seal ring or O-ring 43. A metal core circuit board 44 has soldered to it all of the LEDs (preferably sixteen) of the LED array 24, as shown. The LED array produces a flood beam, approximately 80° spread in water, approximately 110° spread in air (although the spread could be different). Thus, the optics are simple. A reflector 46, best seen in FIG. 2, is incorporated within the recess having the glass window 40 at front. The reflector, preferably conical, may be formed as a surface on the face plate 26, which preferably extends inward as shown. The glass window 40 is indicated as "port" in FIG. 3.

As mentioned above, the LED array 24 is a very tight cluster and generates considerable heat, particularly at high power setting. This is dissipated using a heat sink which comprises the metal core circuit board 44 and metal face plate 26, including the portion extending rearwardly to contact the circuit board 44 as shown. The metal core circuit board 44 is screwed onto the face plate 26, both of which can be aluminum. The large aluminum plate 26 at the face of the unit contacts water on the outside surface, which immediately cools the attached metal core LED board and prevents overheating.

The filter ring 18 is also shown in FIG. 3, rotatable on the housing and retained thereon via the annular groove 30 in the bezel ring 28.

The dive light unit 10 is self-contained, including a rechargeable battery indicated at 50. A wet style recharging terminal (not shown) enables sealing of the unit without need to open it after manufacture.

Figure 4:
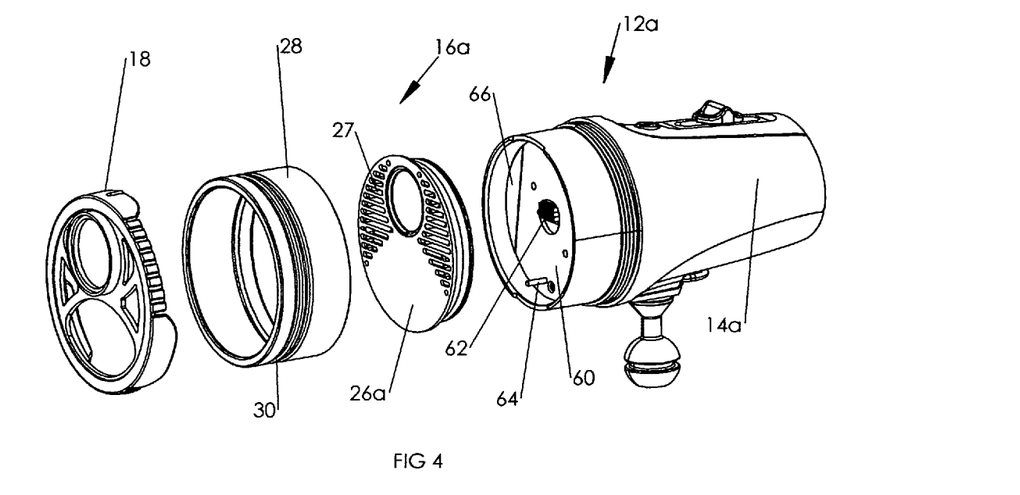
FIG. 4 is an exploded view of the separate assemblies in the second form of the invention.

FIG. 4 shows the assemblies a user will encounter when operating a second form of the invention. The filter ring 18 comes off as previously described. The user then unthreads the bezel ring 28, exposing the edge of a face plate 26a of the face assembly 16a. Pulling on the face plate 26a removes it from the body unit 12a. An intermediary plate 60 encloses the housing or body unit 12a together, being secured to the body 14a, and provides a mounting location for a multi-contact electrical connector 62. The intermediary plate 60 also has two symmetrical thermal transfer pads 66 that contact the back of the face plate 26a to provide an escape path for heat from the electronics inside the body unit. Finally, it has a steel alignment pin 64 so that the user can easily orient the face plate 26a so that the connectors are properly aligned.

Figure 6:
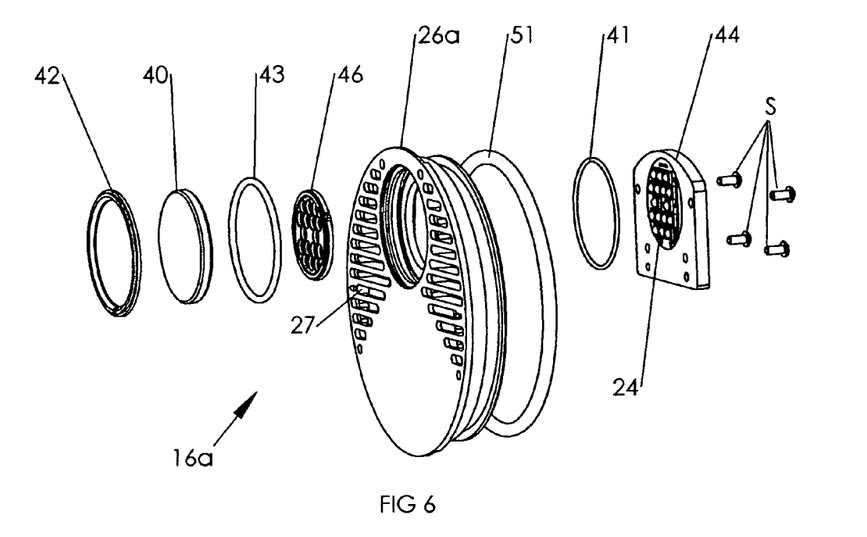
FIG. 6 is an exploded view of the face plate assembly in the second form of the invention.

FIGS. 4 and 6 shows grooves 27 formed in the front of the face plate. These grooves or recesses expand the surface area available for cooling by water contact; they do not extend through the face plate.

Figure 5:
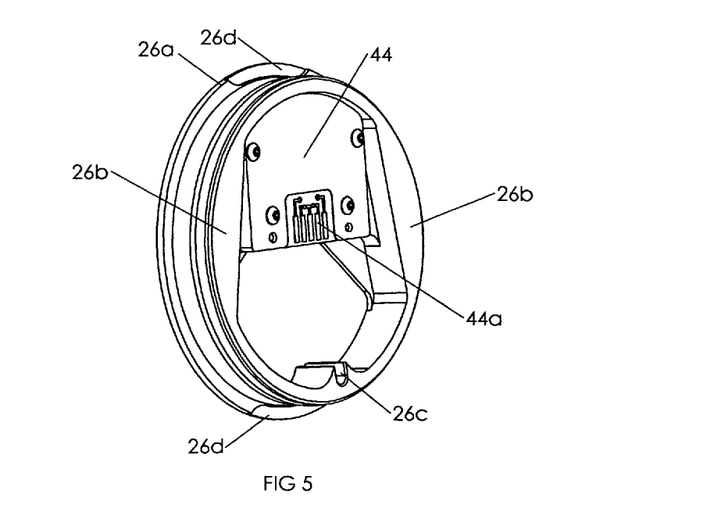
FIG. 5 is a view of the back side of the face plate assembly in the second form of the invention.

FIG. 5 shows the reverse side of the face plate assembly. The previously described LED array is mounted to a metal core circuit board 44, similar to the metal core circuit board described previously. On the back side of that board are gold plated contact pads 44a, which interface with the connector 62 from FIG. 4. Two wide areas 26b provide broad contact for thermal transfer from the thermal pads 66 shown in FIG. 4. An alignment feature 26c accepts the alignment pin 64 shown in FIG. 4 to ensure connector alignment. To help the user remove the front plate assembly from the body unit, there are two stepped areas 26d in face plate 26a that are sized to accept common coins such as a U.S. quarter dollar. Inserting and twisting the coin allows the user to overcome the significant friction of the main bore seal o-ring (part 51 in FIG. 6).

FIG. 6 shows the face plate assembly 16a for this second form of the invention. The face plate 26a holds the reflector 46 and glass port or window 40, sealed by an o-ring 43 and retained by a retaining ring 42, as previously described. The main seal o-ring 51 is installed on the plate 26a to seal against the inner bore of the body unit. The metal core circuit board 44 is sealed to the face plate by an o-ring 41, and held on by four screws S that lie outside the seal groove. This keeps the LED components on the circuit board from any contact with water, even if the main seal o-ring 51 fails at some point.

Figure 7:
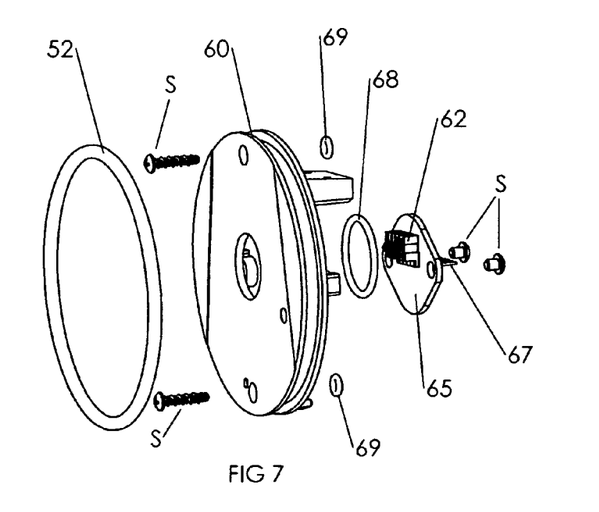
FIG. 7 is an exploded view of the intermediary plate in the second, third, and fourth form of the invention.

FIG. 7 shows the intermediary plate 60 that is installed in the front of the casing or body 14a. It is permanently sealed into the body by a main bore o-ring 52, and held in with two screws S, which are sealed by two small o-rings 69. At the center of the intermediary plate 60 is an opening for mounting a connector circuit board 65, which is sealed to the intermediary plate by an o-ring 68 and held in place with two screws S. Thus the connector board 65 is exposed at the front of the housing or body unit 12a so it can contact the connector pads 44a on the metal core circuit board 44, but otherwise the body unit 12a is completely sealed.

Figure 8:
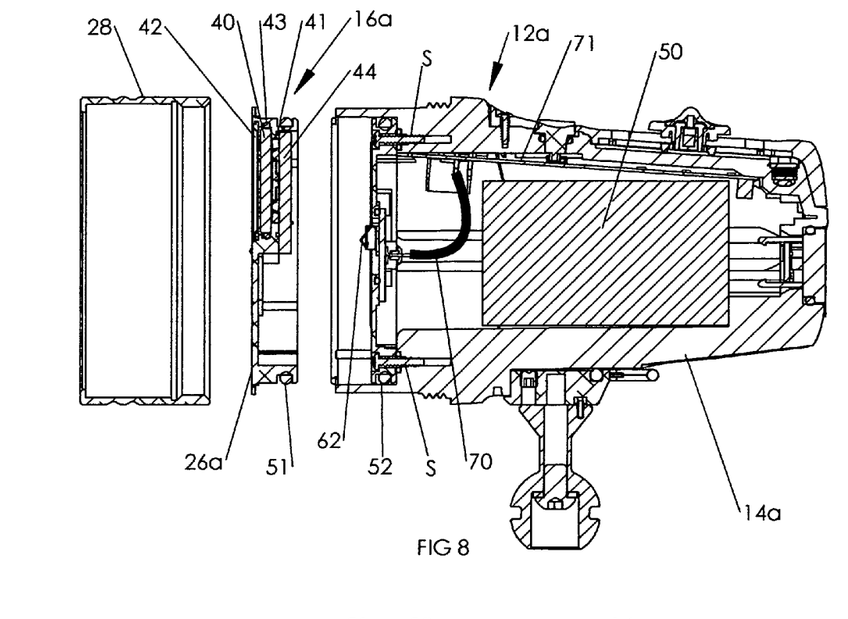
FIG. 8 is a partially exploded side elevation view, in section, of the second form of the invention.
Figure 9:
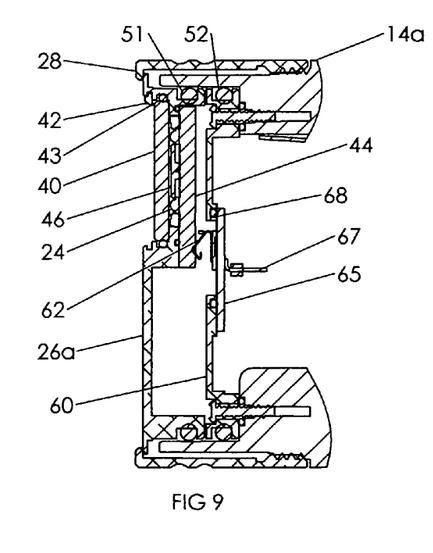
FIG. 9 is a side elevation view, in section, of the second form of the invention, at the front.

FIGS. 8 and 9 show the bezel ring 28, face plate assembly 16a, and casing or body 14a exploded and then assembled in cross section to illustrate the electrical path and assembly method. The battery 50 is connected to a main driver electronics circuit board 71 by a cable (not shown). The driver 71 controls the amount of power routed to the LED cluster, and outputs current through a cable 70, through a header 67 on the back of the connector circuit board 65, through the board, to spring loaded contacts of the connector 62 exposed at the front of the unit 12a. See also FIG. 4. The intermediary plate 60 is sealed into the body 14a by the o-ring 52. The face plate assembly is sealed into the body by the o-ring 51.

The form of diving light shown in FIGS. 4-9 efficiently carries away heat, both from the LED array and from electronics inside the body unit 14a. Heat from electronics inside the body unit is conducted through the contact pads 66 on the intermediary plate 60 to the wide areas 26b on the back of the face plate, via pressed and wide-area contact when the bezel 28 is tightened onto the body. Also, heat from the LED array on the front of the metal core circuit board 44 travels outwardly through the metal board to the tight connection between the metal board 44 and the back side of the face plate 26a. The front of the face plate 26a, cooled by direct contact with water and with enhanced surface area provided by the grooves 27, dissipates the heat from the body 14a and from the LED array to the water.

Note that the metal core circuit board in the embodiments of FIGS. 1-9, in thermal conductive contact with the face plate in both cases, is preferably in direct contact with the face plate, but the contact could be indirect, via intermediary conductive metal.

As noted above, the face plate 26a, for purposes of air travel, can be pulled out from the casing or body 14a after removal of the threaded bezel ring 28. This can also be done for the purpose of interchanging a different face plate on the body, such as for different spot/flood characteristics or different light colors or an upgraded face plate. For air travel, where the LED array may have to be completely disconnected from electronics connected to the battery, the face plate 26a can be flipped around, placed against the front of the body and secured thereon using the bezel ring 28. The exposed rear contacts 44a (FIG. 5) of the face plate, now oriented forwardly, can be covered with a plastic cover or cap (not shown).

Figure 10:
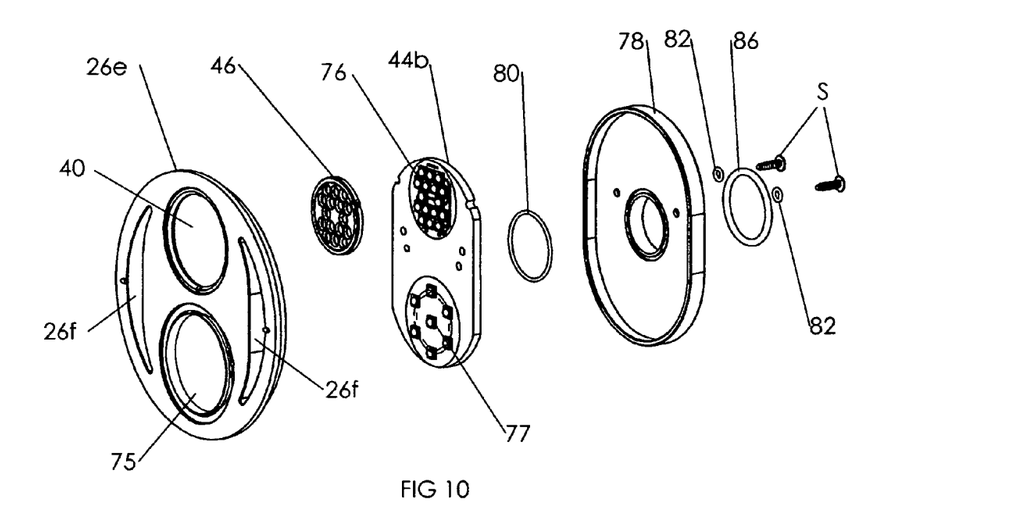
FIG. 10 is an exploded view of the face plate assembly showing the third form of the invention. This figure also shows a face plate with two LED arrays.
Figure 11:
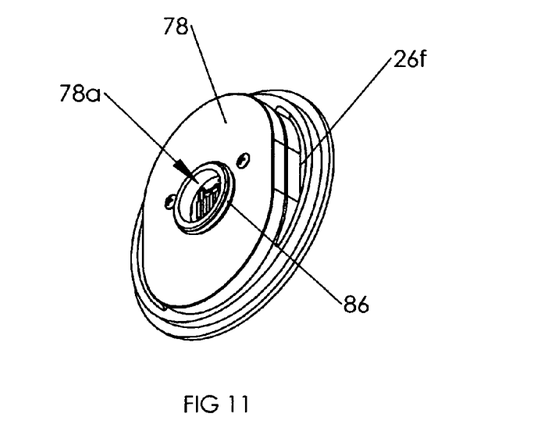
FIG. 11 is a rear view of the face plate assembly showing the third form of the invention.

FIGS. 10 and 11 show a modified assembly with two arrays of LEDs, and also the face plate setup for this third form of the invention. A two-array face plate 26e contains two large circular openings, top and bottom. The top opening contains an identical set of parts as previously described for the single array 24 of LEDs, including a reflector 46 for illustration, and a transparent window 40, preferably a glass port. The bottom opening contains a molded window 75 that is flat on the front but contains seven integrated total-internal-reflection (TIR) optical cones designed to project light in a spot beam. A modified two-array metal core circuit board 44b is shown with an upper array 76 of 16 LEDs and a lower array 77 of seven LEDs in a preferred embodiment, though either number of LEDs could vary.

In this form of the invention, the face plate 26e has two large side openings 26f which allow water to pass through the face plate to cool the internal electronics more directly. A rear cap 78 in this embodiment encloses the entire metal core circuit board, completely sealing the board against water intrusion. The rear cap 78 is sealed to the metal core circuit board at the center by an o-ring 80, creating a small volume 78a to protect the contact pads on the back of the metal core circuit board. The rear cap is held on by screws S that are independently sealed by o-rings 82, and then by a larger outer o-ring 84 shown in FIG. 12. The rear cap contains an o-ring 86 that forms a bore seal on the opening 18a in the intermediary plate (see FIGS. 4 and 7) in use. Thus the entire front plate assembly is independently sealed, and it can connect to the intermediary plate and provide more direct cooling to the electronics. Water can enter through the front plate and extend into a space between the back of the rear cap 78 and the intermediate plate of the sealed body, cooling both directly. The rear cap draws some heat from the circuit board 44b, and may be of relatively thin heat-conducting metal, directly contacting the metal core circuit board 44b to cool the board from the back. The metal board 44b is of thick metal, e.g. copper or aluminum, about ⅛ inch or greater in thickness. It is also in contact with the front panel of the face plate, the front side of which contacts the outside water, so it is cooled from both sides, which helps minimize temperature for best LED light output.

Figure 12:
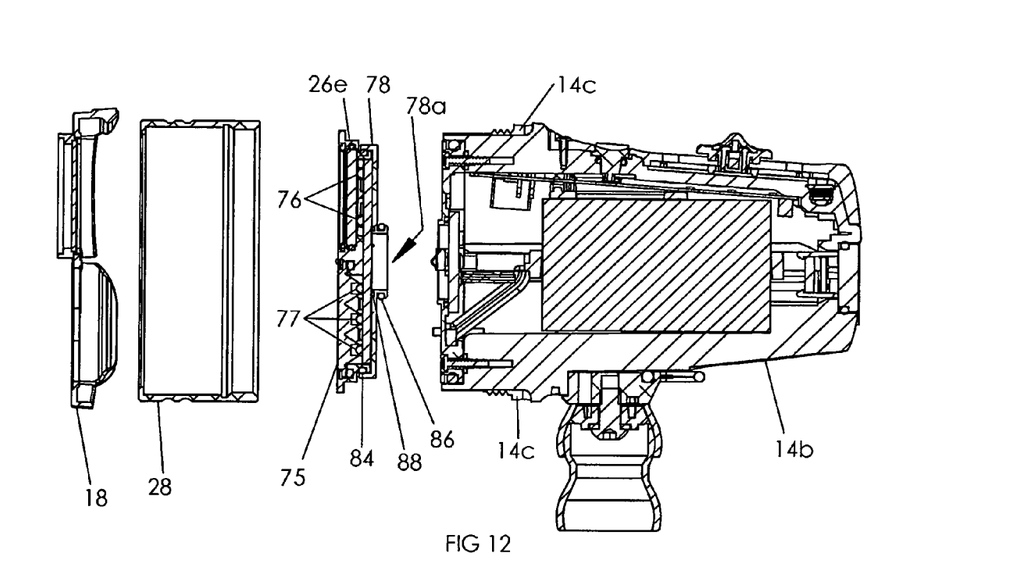
FIG. 12 is a side elevation view in section showing the main assemblies of the third form of the invention exploded by assembly.
Figure 13:
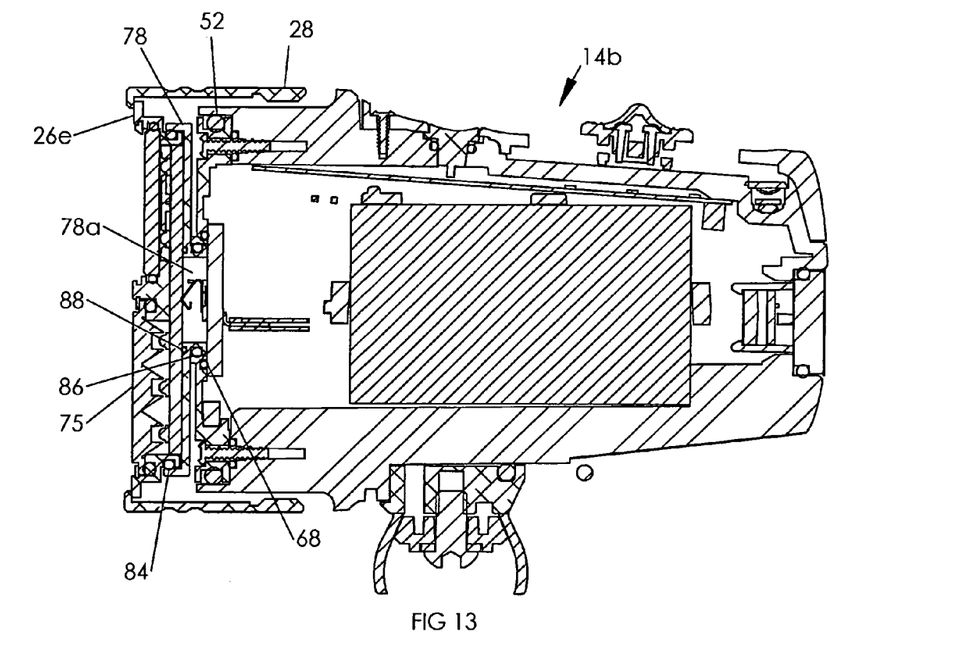
FIG. 13 is a side elevation view in section showing the assembled third form of the invention.

FIGS. 12 and 13 further illustrate the dual array LED embodiment, as well as this third form of the invention. Upper LED array 76 and lower LED array 77 are mounted on the metal core circuit board 44b. The TIR optic 75 is placed in front of the lower array. The outer rim of the rear cap 78 is sealed to the face plate 26e by the o-ring 84. The inner face of the rear cap is sealed to the circuit board by an o-ring 88. These are permanent seals, all within the face plate. The rear cap also contains an o-ring 86 which seals on the bore in the center of the intermediary plate 60. This view also shows a modified body 14b, which has channels 14c at the top and bottom to provide more water flow through the front of the unit. Also, the body 14b is shorter than the previously described version of the body 14a (FIG. 4), both because it does not need to provide a bore seal to the face plate assembly, and because the shorter body provides for better water flow.

Figure 14:
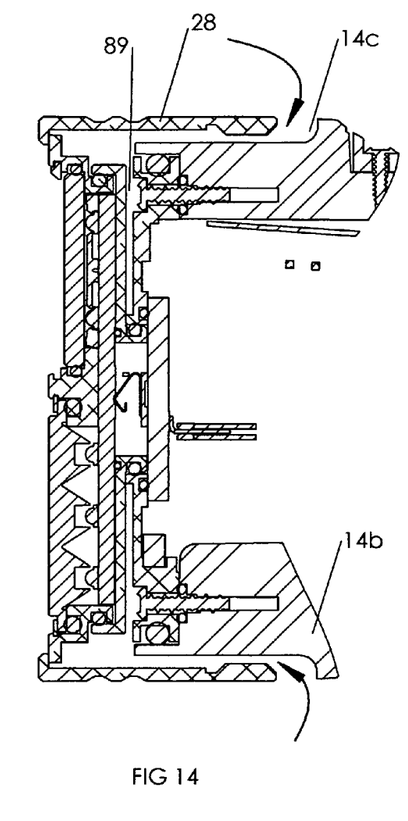
FIG. 14 is a partial side elevation section view of the front of the third form of the invention, showing flow of water into the assembly.
Figure 15:
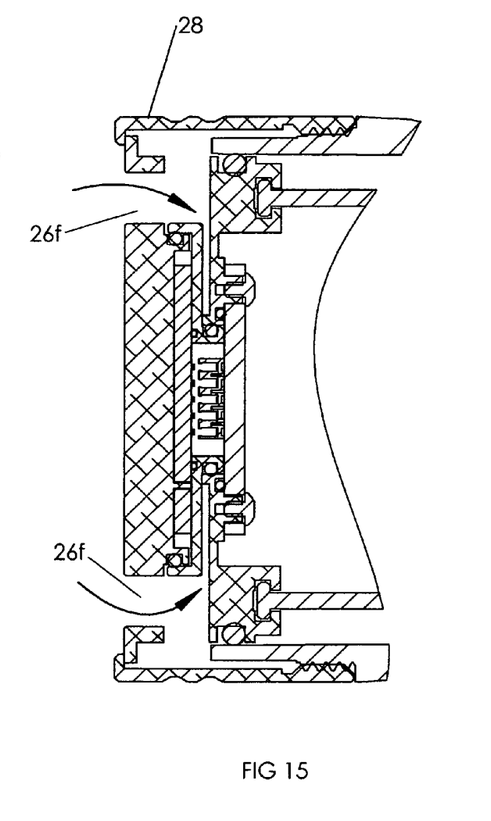
FIG. 15 is a partial top plan section view of the front of the third form of the invention, showing flow of water into the assembly.

FIGS. 14 and 15 show the openings that allow water to flow through the assembly. FIG. 14 is a side elevation cross section which shows the cuts in the body identified above as 14c, that allow water to travel from the top and bottom behind the front bezel ring. The male threads (not shown but seen in FIG. 12) at the front of the body 14b are interrupted at these cuts or channels 14c. FIG. 15 shows a top plan cross section which shows the larger openings 26f which allow water to enter from the front. The areas shown are all connected, so water can freely flow through and circulate via these four openings. More openings could be provided if desired. The water cooling space between the intermediate plate 60 and the rear cap 78 is seen at 89.

Figure 16:
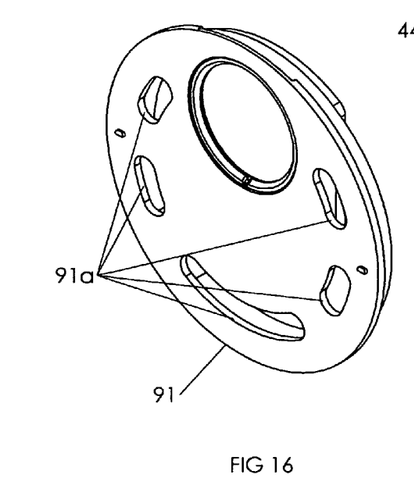
FIG. 16 shows the front of the face plate assembly of the fourth form of the invention.
Figure 17:
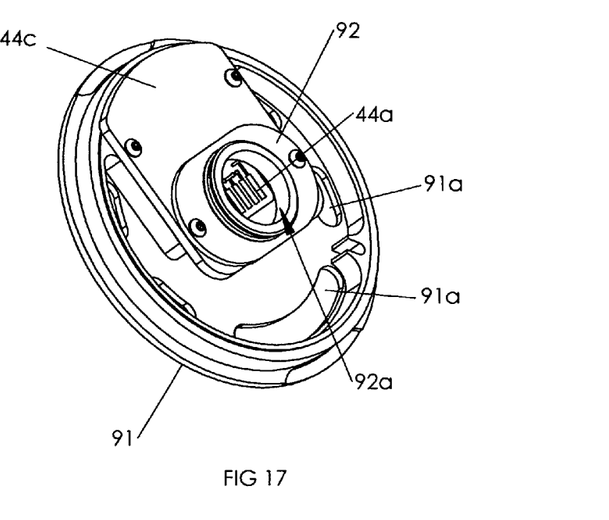
FIG. 17 shows the rear of the face plate assembly of the fourth form of the invention.
Figure 18:
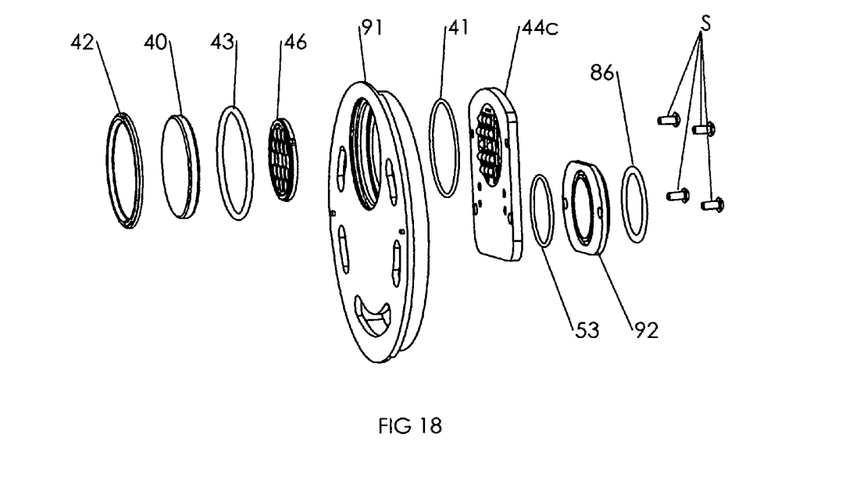
FIG. 18 shows an exploded view of the face plate assembly of the fourth form of the invention.

FIGS. 16 through 18 show a fourth form of the invention. A modified face plate 91 has openings 91a that function similarly to the openings 26f. The shape difference compared to 26f is cosmetic. FIGS. 17 and 18 show the metal core circuit board 44c, now exposed to flowing water (not covered by a rear cap as in FIGS. 10-15), with a smaller, modified form 92 of rear cap. In this form, the cap forms a volume 92a exactly like 78a described above, to enclose the connector pads 44a. However, this cap only seals off a small area of the metal core circuit board with an o-ring 53, leaving the rest exposed to water. The rear cap 92 is sealed to the intermediary plate by a bore seal o-ring 86. The rear cap and metal core circuit board are bolted to the face plate 91 with four screws S to form a permanently sealed face plate assembly. The cooling water enters the space behind the face plate via the openings 91a and directly contacts the metal core circuit board 44c as well as the intermediate plate 60 of the main casing or body. Again, the face plate is easily removable from the main body for interchanging a different face plate or for air travel safety requirements, and also for rinsing salt water off these inner components; rinsing is important for all embodiments.

As noted above, cooling of the metal core circuit board by contact with ambient water is important and preferred, for optimum LED performance. With the water entering the assembly and directly contacting the metal board from behind, the front panel of the face plate might even be formed of plastic.

Figure 19:
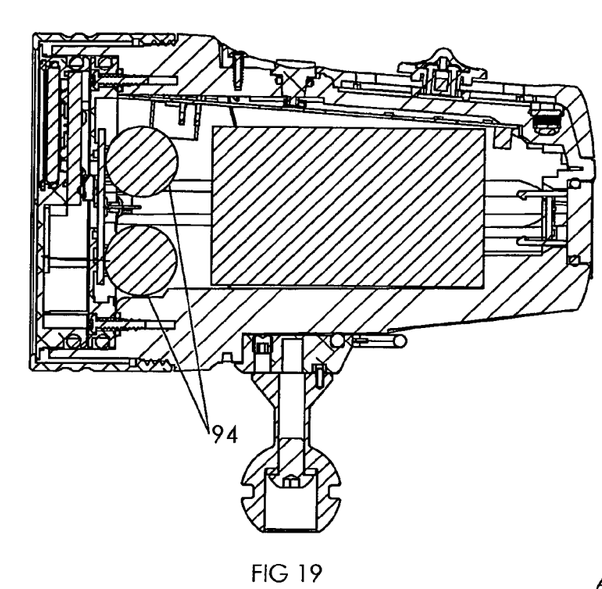
FIG. 19 shows a side elevation section view of the complete unit with large capacitors added to the electronic circuit.

FIG. 19 shows the complete assembly with a single LED array, with the addition of two large capacitors 94 attached to the connector circuit board. In this embodiment, the capacitors shown are rated at 1 microfarad at 100 volts. The battery and driver electronics charge up the capacitor between pulses, and then the capacitors discharge into the LED array on a timing signal, producing approximately 8000 lumens for 1-3 microseconds, as a flash.

Figure 20:
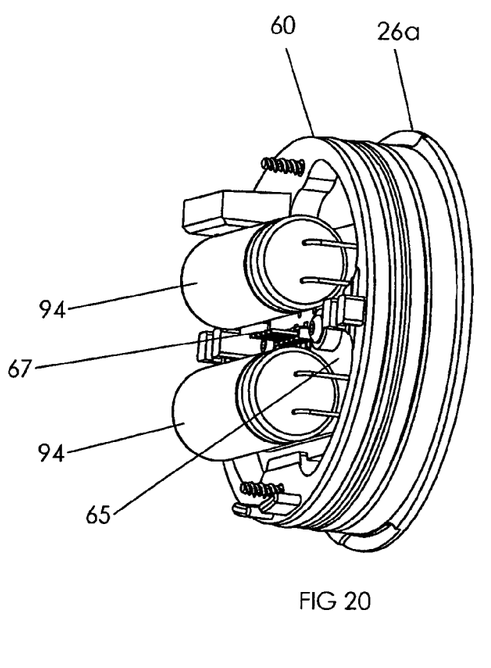
FIG. 20 shows an aspect view of the intermediary plate and the face plate assembly, showing the capacitors on the connector PCBA.

FIG. 20 shows a detailed view of the intermediary plate 60 and a face plate 26a assembled together, with the capacitors 94 attached to the connector board 65, with the connector 67 that brings power and timing signal from the control electronics.

In a preferred embodiment the dive light 10 produces a maximum flood light output (level 7) power of 4000 lumens, which can be maintained for about 50 minutes to one hour. At a medium power setting (level 4) of 1500 lumens, the duration is about 150 minutes. At a low setting (level 1) of 500 lumens, the flood beam will last for about 10 hours. Charge time: 85% at 90 minutes, 100% at 150 minutes. The unit preferably weighs no more than about 750 grams (about 1.65 lb.).

The above described preferred embodiments are intended to illustrate the principles of the invention, but not to limit its scope. Other embodiments and variations to these preferred embodiments will be apparent to those skilled in the art and may be made without departing from the spirit and scope of the invention.

We claim:

1. A diving light for underwater photography, comprising:
    a housing or body containing a battery and electronics, the body having a sealed interior compartment and having an intermediate plate at a front of the sealed interior compartment of the body and a multi-contact electrical connector exposed at a front side of the intermediate plate,
    a face assembly connected to and removable from the front of the body, the face assembly including a face plate securable against the front of the body and a bezel ring removably secured by screw threads to the body and retaining the face plate against the body, the face plate being of heat-conducting metal and facing forward, and the bezel being removable so as to remove the face plate from the body,
    the face plate being configured to be reversed in orientation after removal, and re-secured to the body with the bezel, providing an inoperative configuration,
    the face plate including an LED array positioned to project through a window in the face plate, with a metal core circuit board at rear of the face plate, the LED array being mounted on a front side of the metal core circuit board, and the rear side of the metal core circuit board having electrical contacts,
    the face plate, the metal core circuit board and the intermediate plate of the body being configured such that the metal core circuit board makes tight thermal-transferring contact with the intermediate plate when the face plate is retained on the body with said bezel ring, and such that the electrical contacts of the metal core circuit board make connection with the multi-contact electrical connector of the body,
    the face plate being positioned to be in direct contact with water including at the front side of the face plate such that heat from the LED array is conducted from the metal core circuit board into the metal face plate and directly into the water,
    the LED array being sealed within the face plate against water intrusion independently of connection to the body, and
    an external water-sealed switch on the body for switching the LED light on and off and for selecting power levels.

2. The diving light of claim 1, wherein the LED array is positioned off-center on the face plate, and further including a filter ring secured over the front bezel and over the front of the face plate, rotatable on the front bezel and with at least one filter for positioning in the path of the LED light, rotation being effective to select use of the filter or non-use of the filter.

3. The diving light of claim 1, wherein the filter ring is removable, and configured to snap onto the periphery of the bezel ring.

4. The diving light of claim 1, wherein the face plate includes grooves in a front, water-contacting side of the face plate for increased water contact surface area and increased cooling effect for the LED array.

5. The diving light of claim 1, including a water seal between the face plate and the front of the body.

6. The diving light of claim 1, wherein one of said multi-contact electrical connector and said electrical contacts comprise spring contacts.

7. The diving light of claim 1, including a plurality of different interchangeable face plates securable against the front of the body to provide for different lighting characteristics, the face plate being removable by removing the bezel from the body.

8. A diving light for underwater photography, comprising:
    a housing or body containing a battery and electronics, the body being sealed against intrusion of water,
    a face plate of heat-conducting metal on the front of the housing or body, the face plate facing forward, comprising contiguous metal and including an LED light source positioned to project through a window in the face plate, the LED light source being mounted on a circuit board directly secured to said contiguous metal of the face plate and in thermal conductive contact with said contiguous metal of the face plate, the LED light source being mounted on a front side of the circuit board,
    the contiguous metal of the face plate being positioned to be in direct contact with water along a surface at the front of the face plate such that heat from the LED light source is conducted from the circuit board into the contiguous metal of the face plate and directly into the water in front of the face plate,
    the face plate being configured such that water can enter the diving light between the body and said contiguous metal of the face plate to contact a back side of said contiguous metal of the face plate to cool the LED light source from a back side of the LED light source, and a water-sealed switch on the exterior of the housing or body, connected to selectively power the LED light source, at desired light levels, whereby cooling of the LED light source is effected by contact of water with both the front side of the face plate and the back side of the face plate.

9. The diving light of claim 8, including a bezel secured to the front of the housing or body with screw threads, the face plate being secured against the housing or body by the bezel, the bezel being removable so as to enable removal of the face plate and securing of a different face plate against the body if desired.

10. The diving light assembly of claim 9, wherein the LED light source is positioned off-center on the face plate, and further including a filter ring secured over the front bezel and over the front of the face plate, rotatable on the front bezel and with at least one filter for positioning in the path of the LED light, rotation being effective to select use of the filter or non-use of the filter.

11. The diving light of claim 9, wherein the face plate is configured to be reversed in orientation after removal, and re-secured to the body with the bezel, providing an inoperative configuration.

12. The diving light assembly of claim 8, capable of producing a maximum flood light output power of about 4000 lumens which can be maintained for at least about 50 minutes.

13. The diving light assembly of claim 12, wherein the battery is rechargeable to about 85% in 90 minutes and to full charge in about 150 minutes.

14. The diving light assembly of claim 8, further including at least one capacitor within the body, with circuitry connected to the battery and to the capacitor to charge the capacitor, the capacitor being connected to discharge into the LED light source to produce a high-lumen light output for several microseconds, when flash is selected by a user.

15. The diving light of claim 8, wherein the LED light source comprises an LED array in a tight cluster.

16. The diving light of claim 8, wherein the LED light source is positioned off-center in the face plate, and including a filter ring secured onto the front of the housing or body and over the face plate in snap-on relationship, rotatable relative to the face plate and with at least one filter for positioning in the path of light from the LED source, rotation being effective to select use of the filter or non-use of the filter.

17. The diving light of claim 16, further including a bezel secured to the front of the housing or body, the bezel having an annular outer circumferential recess, and the filter ring having a rim with overhanging structure snapped into place in the annular circumferential recess to hold the filter ring in place on the housing or body, allowing snap-off removal and interchanging of the filter ring with different filter rings.

* * * * *